United States Patent
Gardner et al.

(10) Patent No.: US 6,707,856 B1
(45) Date of Patent: Mar. 16, 2004

(54) TRANSMISSION OF SYSTEM CONFIGURATION INFORMATION

(75) Inventors: James M. Gardner, San Jose, CA (US); Vincent K. Jones, Redwood City, CA (US)

(73) Assignee: Cisco Technology, San Jose, CA (US)

( * ) Notice: Subject to any disclaimer, the term of this patent is extended or adjusted under 35 U.S.C. 154(b) by 0 days.

(21) Appl. No.: 09/415,014

(22) Filed: Oct. 7, 1999

(51) Int. Cl.[7] .......................... H04K 1/10; H04B 1/38; H04J 11/00
(52) U.S. Cl. .................. 375/260; 375/219; 370/203
(58) Field of Search ................ 370/203, 204, 370/206, 207, 310, 343, 350, 464, 465, 480, 496, 528, 522; 375/219, 224, 266, 259, 260, 295, 316, 340, 354

(56) References Cited

U.S. PATENT DOCUMENTS

| | | | |
|---|---|---|---|
| 5,282,222 A | | 1/1994 | Fattouche et al. ............. 375/1 |
| 5,732,113 A | * | 3/1998 | Schmidl et al. ............. 375/355 |
| 6,158,041 A | * | 12/2000 | Raleigh et al. ............. 714/792 |
| 6,452,981 B1 | * | 9/2002 | Raleigh et al. ............. 375/299 |
| 6,487,253 B1 | * | 11/2002 | Jones et al. ................. 375/260 |
| 6,549,592 B1 | * | 4/2003 | Jones .......................... 375/354 |

OTHER PUBLICATIONS

Jones et al., "Improved OFDM channel identification", 1999, U.S. patent application No. 09/234,929.

Jones et al., "Differential OFDM using multiple receiver antennas", 1999, U.S. patent application No. 09/282,589.

Rohling et al., "Differential amplitude phase shift keying (DAPSK)—A new modulation method for DTVB", 1995, International Broadcasting Convention, Conference Publication No. 413.

John G. Proakis, "Digital Communications", 3$^{rd}$ Edition, Ch. 5: Optimum Receivers for the Additive White Gaussian Noise Channel, pp. 274–278.

IEEE Standard 802.11a–1999. "Part 11: Wireless LAN Medium Access Control (MAC) AND Physical Layer (PHY) specifications High–speed Physical Layer in the 5 GHz Band," Sep. 1999, pp. 1–83.

* cited by examiner

*Primary Examiner*—Khai Tran
(74) *Attorney, Agent, or Firm*—Ritter, Lang & Kaplan LLP

(57) ABSTRACT

Systems and methods for transmitting configuration information in an OFDM communication system. In one embodiment, within a frequency domain burst certain symbols allocated for use in channel estimation also carry system configuration information. The system configuration information may be encoded as phase differences between corresponding training symbols of successive bursts.

31 Claims, 4 Drawing Sheets

TRANSMISSION OF SYSTEM CONFIGURATION INFORMATION

STATEMENT OF RELATED APPLICATIONS

The present application is related to the subject matter of U.S. patent application Ser. No. 09/234,929, filed on Jan. 21, 1999, entitled OFDM CHANNEL IDENTIFICATION, the contents of which are herein incorporated by reference.

BACKGROUND OF THE INVENTION

The present invention is related to digital communication systems and more particularly to systems and methods for transmitting system configuration information between nodes of a communication system.

Orthogonal Frequency Division Multiplexing (OFDM) systems offer significant advantages in many real world communication systems, particularly in environments where multipath effects impair performance. OFDM divides the available spectrum within a channel into narrow subchannels. In a given so-called "burst," each subchannel transmits one data symbol. Each subchannel therefore operates at a very low data rate compared to the channel as a whole. To achieve transmission in orthogonal subchannels, a burst of frequency domain symbols are converted to the time domain by an IFFT procedure. To assure that orthogonality is maintained in dispersive channels, a cyclic prefix is added to the resulting time domain sequence. The cyclic prefix is a duplicate of the last portion of the time domain sequence and is appended to the beginning. To assure orthogonality, the cyclic prefix should be at least as long as the duration of the impulse response of the channel.

To maximize the performance of an OFDM system, it is desirable that the response of the channel be known at the receiver end of the link. To provide the receiver with knowledge of the channel response, the transmitter typically includes training symbols as part of the frequency domain burst. The training symbols have known values when transmitted and their values as received may be used in determining the channel response. Most of the remaining symbols are used to transmit data.

Successful communication requires a shared understanding of certain system parameters between the transmitter and the receiver. The transmitter and receiver must agree on the symbol constellation used to communicate. If channel coding is used to increase reliability, the transmitter and receiver need to agree to certain parameters. For example, if a Reed-Solomon code is to be used, both transmitter and receiver should agree as to the number of parity bytes to be included in each Reed-Solomon codeword. For convolutional or trellis encoding schemes, the transmitter and receiver must agree to the particular code being used including the so-called encoder rate.

Such parameters may be predetermined as part of the system design. It is, however, useful to vary some configuration parameters to adapt to varying data communication requirements and/or channel conditions. One could have the transmitter determine the parameters to use and then have the receiver attempt to discover the parameters being used by the transmitter by analysis of the received signal. This however requires a relatively large amount of computation time at the receiver and a substantial increase in receiver complexity and loss of robustness.

In the OFDM context, it is known to explicitly send communication configuration parameters from a transmitter to a receiver by reserving extra symbols besides the training and data symbols in each frequency domain burst for that purpose. This is the technique employed in the Digital Video Broadcasting (DVB) adopted in Europe for terrestrial video broadcasting. Each OFDM frequency domain burst then includes both periodically spaced training symbols and randomly spaced system configuration symbols.

The overhead required to transmit system configuration information reduces the available capacity for transmitting data. What is needed are systems and methods for transmitting system configuration information without affecting the amount of data that may be transmitted.

SUMMARY OF THE INVENTION

Systems and methods for transmitting configuration information in an OFDM communication system are provided by virtue of the present invention. In one embodiment, within a frequency domain burst certain symbols allocated for use in channel estimation also carry system configuration information. The system configuration information may be encoded as phase differences between corresponding training symbols of successive bursts.

According to a first aspect of the present invention, transmitter apparatus is provided for use in a digital communication system employing orthogonal frequency division multiplexing. The transmitter apparatus includes: a training information formation block that develops a first set of training symbols and a second set of training symbols. Communication configuration information is encoded as phase differences between training symbols of the first set and corresponding symbols of the second set. The apparatus further includes a training symbol/data symbol selector that forms a series of OFDM frequency domain bursts including the first set of training symbols and OFDM frequency domain bursts including the second set of training symbols. The series of OFDM frequency domain bursts is transmitted from a first node to a second node.

A second aspect of the present invention provides receiver apparatus for use in a digital communication system employing orthogonal frequency division multiplexing. The receiver apparatus includes: a transform block that provides first and second OFDM frequency domain bursts based on received signals, a data/training separation block that extracts a first set of training symbols from the first OFDM frequency domain burst and a second set of training symbols from the second OFDM frequency domain burst, a differential decoder that obtains phase differences between symbols of the second set of training symbols and the first set of training symbols, and a control processor that determines communication configuration information based on the phase differences.

A third aspect of the present invention provides transmitting apparatus for use in a digital communication system employing orthogonal frequency division multiplexing. The apparatus transmits configuration information from a first node to a second node. The apparatus includes a burst formation system that forms a frequency domain burst. The burst includes data symbols and training symbols. The training symbols also encode configuration information. The burst also includes a transform block that converts the frequency domain burst into a time domain burst for transmission from the first node to the second node.

A fourth aspect of the present invention provides receiving apparatus for use in a digital communication system employing orthogonal frequency division multiplexing. The apparatus receives configuration information. The apparatus includes: a converter that converts a received time domain signal into a series of OFDM frequency domain bursts, a selector that extracts training symbols from the series of OFDM frequency domain bursts, a channel estimation block that estimates channel response based on the training symbols, and a control processor that determines system configuration based on the training symbols.

A further understanding of the nature and advantages of the inventions herein may be realized by reference to the remaining portions of the specification and the attached drawings.

BRIEF DESCRIPTION OF THE DRAWINGS

FIG. 2A depicts a first type of frequency domain burst according to one embodiment of the present invention.

FIG. 2B depicts a second type of frequency domain burst according to one embodiment of the present invention.

FIG. 3 depicts a burst transmission pattern according to one embodiment of the present invention.

DESCRIPTION OF SPECIFIC EMBODIMENTS

In one embodiment, the present invention provides systems and methods for transmitting communication configuration parameters in an OFDM communication system. In one embodiment, the OFDM communication system is implemented in a point to multipoint network. This, however, is only a representative application of the present invention. For example, In an alternative embodiment, communication configuration parameters are transmitted between nodes of a point to point.

Figure 1:
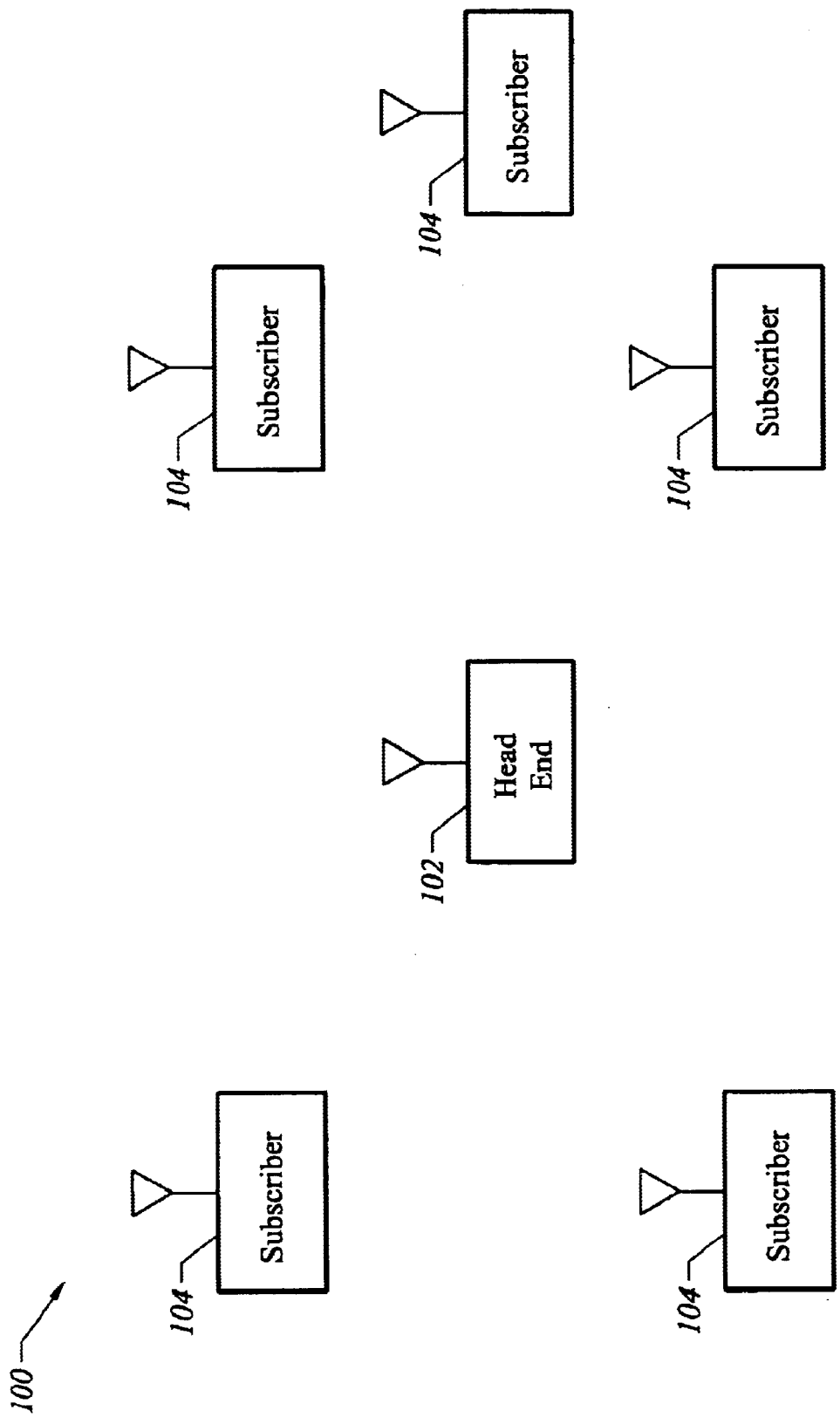
FIG. 1 depicts a point to multipoint network suitable for implementing one embodiment of the present invention.

FIG. 1 depicts a point to multipoint wireless communication network 100 suitable for implementing one embodiment of the present invention. Network 100 includes a central access point or headend 102 and multiple subscriber units 104. All communication is typically to or from central access point 102. Communication from central access point 102 to one or more subscriber units 104 is herein referred to as downstream communication. Communication form any one of subscriber units 104 to central access point 102 is herein referred to as upstream communication. In one embodiment, system configuration parameters such as constellation size, convolutional encoder rate, and number of parity bytes used in Reed-Solomon codewords, are set at central access point 102 and communicated downstream to subscriber units 104.

Network 100 may employ OFDM. The abbreviation "OFDM" refers to Orthogonal Frequency Division Multiplexing. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an FFT is applied to a series of frequency domain symbols. The resulting time domain burst is augmented with a cyclic prefix prior to transmission. The cyclic prefix addition process can be characterized by the expression:

$$[z(1) \ldots z(N)]^T \rightarrow [z(N-v+1) \ldots z(N)z(1) \ldots z(N)]^T$$

On the receive end, the cyclic prefix is removed from the received time domain symbols. An IFFT is then applied to recover the simultaneously transmitted frequency domain symbols. The cyclic prefix has length v where v is greater than or equal to a duration of the impulse response of the channel. The cyclic prefix assures orthogonality of the frequency domain subchannels.

There are other ways of creating transmitted bursts of symbols in orthogonal subchannels or substantially orthogonal subchannels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels defined by procedures performed on a time domain sequence. The term frequency domain should be understood to refer to any domain that is divided into such orthogonal or substantially orthogonal subchannels.

In one embodiment, each frequency domain burst includes training symbols that have values known at the receiver. At the receiver end, the channel can be characterized by its effect on the training symbols. To completely characterize the frequency response of the channel, it is sufficient to use $\mu$ training symbols within each burst where $\mu$ is greater than or equal to an impulse response duration of the channel measured in symbol periods. According to the present invention, these training symbols may also carry communication configuration information. This information may be encoded as phase differences between training symbols of successive OFDM frequency domain bursts.

Figures 2A, 2B, 3:
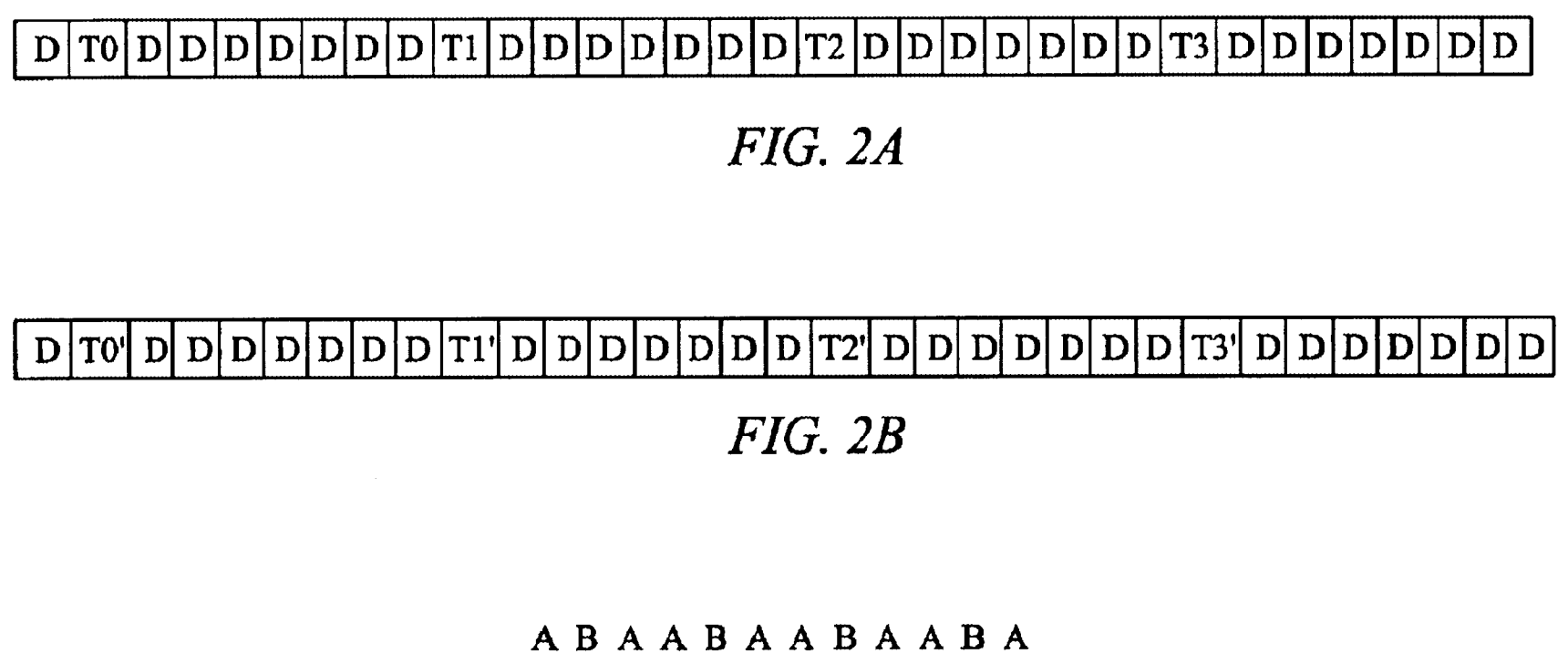

FIG. 2A depicts the organization of a frequency domain burst of a type A while FIG. 2B depicts the organization of a frequency domain burst of a type B. The data symbols are denoted by the letter "D." Training symbols are denoted by Tx in FIG. 2A and by Tx' in FIG. 2B. In the depicted examples, the burst length is 32 and there are 29 data symbols and 4 training symbols in each burst. The burst length, number of training symbols, and number of data symbols have been chosen for ease of illustration.

The receiver may recover the communication configuration parameters by obtaining for a pair of bursts belonging to type A and to type B the values $A(n)B^*(n)$ where n is a frequency domain index value and belongs to the set J that defines all the training symbol positions. In one embodiment, QPSK is employed for each training symbol position. The communication configuration parameters encoded by the training symbols include the constellation size used for the data symbols, the convolutional code rate, the interleaver depth and the amount of parity generated by the Reed-Solomon coding process.

To facilitate identifying which bursts belong to type A and which bursts belong to type B, the type A bursts and type B bursts are arranged in the pattern depicted in FIG. 3. It is also possible to employ a pattern where bursts of type A and type B simply alternate by allocating certain ones of the training symbols to carry information identifying the burst type rather than the system configuration parameters.

Figure 4:
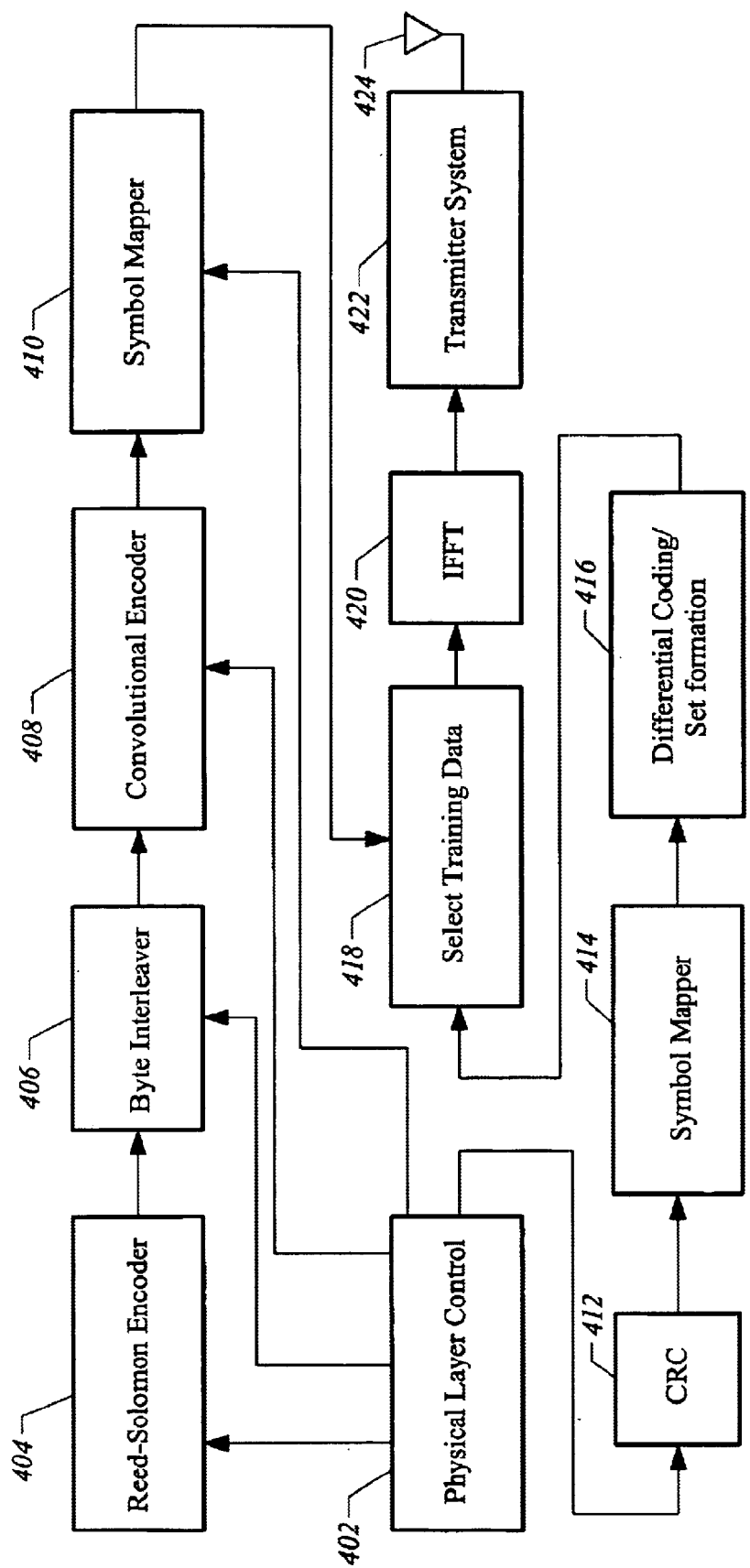
FIG. 4 depicts a transmitter according to one embodiment of the present invention.

FIG. 4 depicts a transmitter 400 according to one embodiment of the present invention. Transmitter 400 may be implemented within central access point 100, for example. A physical layer processor 402 coordinates overall transmitter operation, defines encoding and modulation parameters, and arranges for their transmission. Data to be transmitted is input to a Reed-Solomon encoder 404. Data output by Reed-Solomon encoder 404 is in the form of Reed-Solomon codewords. Each codeword includes 2*t parity bytes where t is defined by a configuration signal from physical layer control processor 402.

Reed-Solomon codewords are forwarded to a byte interleaver 406. Byte interleaver 406 reorders the encoded bytes to improve resistance to burst channel impairments. The time span over which byte interleaver 406 reorders bytes is known as the interleaver depth and is controlled by an interleaver depth signal generated by physical layer control processor 402.

A convolutional encoder 408 applies a convolutional code. The degree of redundancy introduced by convolutional encoder 408 may be varied by periodic deletions of output bits of convolutional encoder 408. Variation in the frequency of deletions implements a variation in the convolutional encoder rate, i.e., the ratio of input bits to output bits. The rate is controlled by a signal from physical layer control processor 402.

The output of convolutional encoder 408 is then input into a symbol mapper 410. Symbol mapper 410 maps bits to symbols in accordance with a currently defined symbol constellation. Symbol mapper 410 may employ a variety of constellations. The currently employed constellation is determined by a constellation size control signal generated by physical layer control processor 402. The output of symbol mapper 410 then consists of a stream of data symbols for inclusion within frequency domain OFDM bursts.

Physical layer control processor 402 also outputs system configuration information to be encoded onto training symbols. In one embodiment, a single byte indicates a current constellation size, convolutional code rate, interleaver depth, and number of Reed-Solomon parity bytes. The mapping between possible values of these parameters and byte values within a single system configuration byte is presented in the following table:

| Parameter | Possible Values | Bit Mapping |
|---|---|---|
| Constellation Size | 4 | 00XX XXXX |
|  | 16 | 01XX XXXX |
|  | 64 | 10XX XXXX |
|  | 256 | 11XX XXXX |
| Code Rate | ½ | XX00 XXXX |
|  | ⅔ | XX01 XXXX |
|  | ⅚ | XX10 XXXX |
|  | ⅞ | XX11 XXXX |
| Interleaver Depth | 4 | XXXX 000X |
|  | 6 | XXXX 001X |
|  | 9 | XXXX 010X |
|  | 12 | XXXX 011X |
|  | 18 | XXXX 100X |
|  | 24 | XXXX 101X |
|  | 28 | XXXX 110X |
|  | 36 | XXXX 111X |
| RS Parity | 14 | XXXX XXX0 |
|  | 20 | XXXX XXX1 |

In one embodiment, a CRC coder block 412 applies a 24 bit CRC code to obtain 32 bits for each configuration parameter byte. Symbol mapper 414 uses the resulting 32 bits to select 16 QPSK constellation points.

A differential coding set formation block 416 forms sets of training symbols for inclusion within bursts A and B as shown in FIGS. 2A–2B. The training symbols of burst type A have fixed predetermined values. The training symbols of burst type B have fixed magnitudes but their phases are set so that the phase differences between training symbols of burst type A and corresponding training symbols of burst type B match values output by symbol mapper 414.

Preferably, each burst pair includes 16 pairs of training symbols and communicates all of the configuration information listed above. If the number of training symbol pairs is greater than needed to transmit the configuration parameters once in each burst, the information is repeated to the extent possible to improve resistance to noise and/or interference.

The output of differential coding block 416 consists of sets of training symbols for inclusion within burst types A and B. The sets of training symbols are output in the pattern defined by FIG. 3.

A selection block 418 then forms successive bursts of type A and B by combining the frequency domain data symbols output by symbol mapper 410 and the training symbols output by differential coding block 416. Selection block 418 forms the bursts, e.g., according to the structures depicted in FIGS. 2A–2B and outputs successive frequency domain OFDM bursts to an IFFT block 420. IFFT block 420 converts the frequency domain burst to the time domain and affixes cyclic prefixes. A transmitter system 422 converts the baseband digital signal to analog, upconverts the signal to an intermediate frequency (IF), amplifies and otherwise processes the IF signal, upconverts the IF signal to a radio frequency (RF), amplifies and otherwise processes the RF signal, and transmits the RF signal via an antenna 424.

Figure 5:
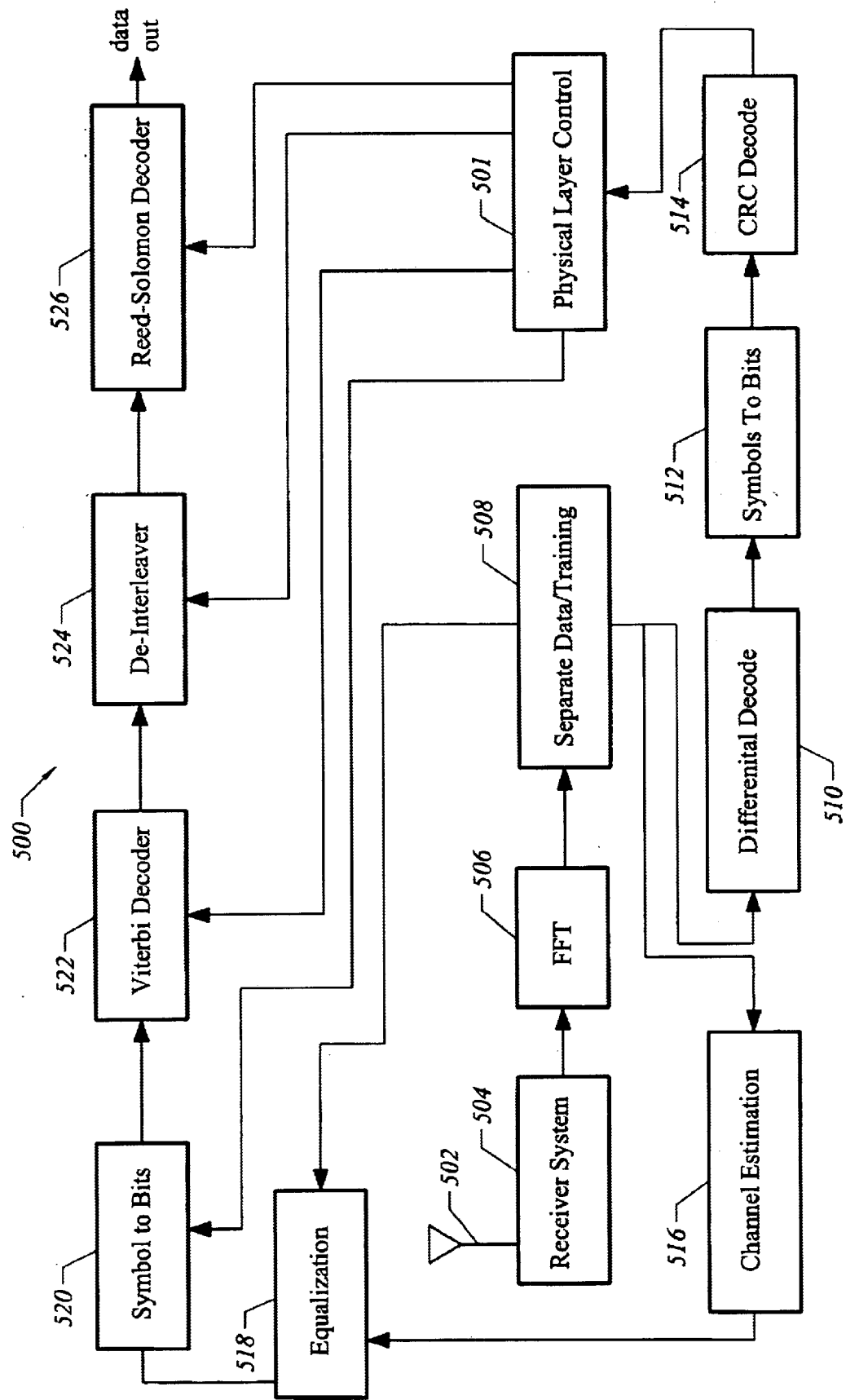
FIG. 5 depicts a receiver according to one embodiment of the present invention.

FIG. 5 depicts a receiver 500 according to one embodiment of the present invention. Receiver 500 may be included within one of subscriber units 104. Overall operation of receiver 500 including detection of transmitted configuration information and control of configuration parameters is performed by a physical layer control processor 501. Signals from transmitter 400 are incident on an antenna 502 and input into a receiver system 504. The signals received via antenna 502 are RF signals. Receiver system 504 amplifies and filters the RF signals, downconverts the RF signals to an intermediate frequency, filters and otherwise processes the IF signals, downconverts the IF signals to baseband, and performs analog to digital conversion. The output of receiver system 504 is a series of OFDM time domain bursts.

An FFT block 506 removes the cyclic prefix from each time domain burst and converts the time domain burst to the frequency domain. A data/training separation block 508 extracts the training symbols from each burst according to the structures of FIGS. 2A–2B. The training symbols are forwarded to a differential decoder block 510 and to a channel estimation block 516. The data symbols are forwarded to an equalization block 518.

Differential decoder block 510 recovers $A(n)B^*(n)$ for each burst pair including a A burst and a succeeding B burst for each n belonging to set J. Redundant results of individual computations of $A(n)B^*(n)$ are averaged together to form detection symbols that carry the system configuration information. A symbol to bit conversion block 512 converts the detection symbols to CRC encoded bytes. A CRC decoding block 514 recovers the configuration control bytes and forwards them to physical layer control processor 501.

In order to find $A(n)B^*(n)$, differential decoder block 510 must be aware of which bursts are A type bursts in which are B type bursts. Differential decoder block 510 initially aligns itself to the pattern of FIG. 3. To obtain alignment, differential decoder block 510 computes $$\sum_{n \in J} X^*(n, k) X(n, k+1)$$

for each successive pair of bursts where n represents a frequency domain symbol position occupied by a training symbol, and k represents a burst index. This computed quantity will be a maximum where two type A bursts occur in succession within the pattern of FIG. 3. By identifying the locations of these maxima, differential decoder block 510 aligns to the pattern of FIG. 3 and identifies which bursts belong to type A and which bursts belong to type B.

Channel estimation block 516 estimates the channel response based on the received training symbols received from block 508. Channel estimates for each frequency domain position are formed based on the training symbol values as received divided by the known transmitted training symbol values. For burst type A the transmitted training symbol values will always be the same and are known without further processing. The burst type B training symbol values are not known until the configuration information is recovered by differential decoder 510. The configuration information typically stays constant for a long period of time during which the transmitted training symbols values for burst type B are also known. When the configuration information changes, the known transmitted training symbol values for burst type B should be updated. Channel estimation block 516 forms an overall channel response for all of the frequency domain symbol positions based on a channel estimation technique such as the one disclosed in U.S. application Ser. No. 09/234,929, the contents of which are herein incorporated by reference.

Equalization block 518 applies the estimated channel response to correct the values of received data symbols. A symbol to bit conversion block 520 then converts the corrected symbols to bits in accordance with a current constellation size provided by physical layer control processor 501. Alternatively, soft decision values for individual bytes are generated.

A Viterbi decoder 522 convolutionally decodes the output of symbol to bit conversion block 520. Viterbi decoder 522 is aware of the location of bits deleted at the transmit end to implement the encoding rate specified by physical layer control processor 501. These bits are treated as erasures by the decoding process.

A deinterleaving block 524 reorders the output of Viterbi decoder 522 in accordance with the interleaving scheme of byte interleaver 406. Deinterleaving block 524 operates according to an interleaver depth specified by physical layer control processor 501.

A Reed-Solomon decoder 526 performs Reed Solomon decoding on the output bytes of deinterleaving block 524. Reed-Solomon decoder 526 assumes that each Reed-Solomon codeword includes a number of parity bytes specified by physical layer control processor 501. The output of Reed-Solomon decoder 526 is an estimate of the data input to Reed-Solomon encoder 404 at the transmit end. Physical layer control processor 501 obtains the constellation size, interleaver depth, encoder rate, and parity information from the configuration control bytes recovered from the training symbols.

It is understood that the examples and embodiments described herein are for illustrative purposes and that various modifications or changes in light thereof will be suggested to persons skilled in the art and are to be included within the spirit and purview of this application and scope of the appended claims and their full scope of equivalents. For example, the present invention may be applied to wired systems rather than wireless systems. All publications, patents, and patent applications cited herein are hereby incorporated by reference.

What is claimed is:

1. In a digital communication system employing orthogonal frequency division multiplexing, a method for transmitting configuration information from a first node to a second node, said method comprising:

developing a first set of training symbols;

developing a second set of training symbols, wherein communication configuration information is encoded as phase differences between training symbols of said first set and corresponding symbols of said second set; and transmitting a series of OFDM frequency domain bursts including OFDM frequency domain bursts comprising said first set of training symbols and OFDM frequency domain bursts comprising said second set of training symbols.

2. The method of claim 1 wherein transmitting said series of OFDM frequency domain bursts comprises transmitting in a pattern wherein said first set of training symbols is transmitted followed by said second set of training symbols followed by said first set of training symbols followed by said first set of training symbols.

3. The method of claim 1 wherein said communication configuration information comprises constellation size.

4. The method of claim 1 wherein said communication configuration information comprises convolutional code rate.

5. The method of claim 1 wherein said communication configuration information comprises interleaver depth.

6. The method of claim 1 wherein said communication configuration information comprises information indicating number of parity bytes in Reed-Solomon codewords.

7. In a digital communication system employing orthogonal frequency division multiplexing, a method for receiving configuration information, said method comprising:

receiving first and second OFDM frequency domain bursts;

extracting a first set of training symbols from said first OFDM frequency domain burst and a second set of training symbols from said second OFDM frequency domain burst; and obtaining phase differences between symbols of said second set of training symbols and said first set of training symbols; and determining communication configuration information based on said phase differences.

8. The method of claim 7 further comprising:

using at least one of said first set of training symbols and said second set of training symbols to estimate a channel response.

9. The method of claim 7 wherein said communication configuration information comprises constellation size.

10. The method of claim 7 wherein said communication configuration information comprises convolutional code rate.

11. The method of claim 7 wherein said communication configuration information comprises interleaver depth.

12. The method of claim 7 wherein said communication configuration information comprises information indicating number of parity bytes in Reed-Solomon codewords.

13. In a digital communication system employing orthogonal frequency division multiplexing, transmitter apparatus comprising:

a training information formation block that develops a first set of training symbols and a second set of training symbols, wherein communication configuration information is encoded as phase differences between training symbols of said first set and corresponding symbols of said second set; and a training symbol/data symbol selector that forms a series of OFDM frequency domain bursts including OFDM frequency domain bursts comprising said first set of training symbols and OFDM frequency domain bursts comprising said second set of training symbols, said series of OFDM frequency domain bursts being transmitted from a first node to a second node.

14. The apparatus of claim 13 wherein said series of OFDM frequency domain bursts are transmitted in a pattern wherein said first set of training symbols is transmitted followed by said second set of training symbols followed by said first set of training symbols followed by said first set of training symbols.

15. The apparatus of claim 13 wherein said communication configuration information comprises constellation size.

16. The apparatus of claim 13 wherein said communication configuration information comprises convolutional code rate.

17. The apparatus of claim 13 wherein said communication configuration information comprises interleaver depth.

18. The apparatus of claim 13 wherein said communication configuration information comprises information indicating number of parity bytes in Reed-Solomon codewords.

19. In a digital communication system employing orthogonal frequency division multiplexing, receiver apparatus comprising:
    a transform block that provides first and second OFDM frequency domain bursts based on received signals;
    a data/training separation block that extracts a first set of training symbols from said first OFDM frequency domain burst and a second set of training symbols from said second OFDM frequency domain burst;
    a differential decoder that obtains phase differences between symbols of said second set of training symbols and said first set of training symbols; and
    a control processor that determines communication configuration information based on said phase differences.

20. The apparatus of claim 19 further comprising:
    a channel estimation processor that uses at least one of said first set of training symbols and said second set of training symbols to estimate a channel response.

21. The apparatus of claim 19 wherein said communication configuration information comprises constellation size.

22. The apparatus of claim 19 wherein said communication configuration information comprises convolutional code rate.

23. The apparatus of claim 19 wherein said communication configuration information comprises interleaver depth.

24. The apparatus of claim 19 wherein said communication configuration information comprises information indicating number of parity bytes in Reed-Solomon codewords.

25. In a digital communication system employing orthogonal frequency division multiplexing, a method for transmitting configuration information from a first node to a second node, said method comprising:
    forming a frequency domain burst, said burst comprising data symbols and training symbols, said training symbols also encoding configuration information; and
    transmitting said frequency domain burst from said first node to said second node; and
    wherein said configuration information comprises at least one of constellation size, convolutional code rate, interleaver depth, and number of parity bytes in Reed-Solomon codewords.

26. In a digital communication system employing orthogonal frequency division multiplexing, apparatus for transmitting configuration information from a first node to a second node, said apparatus comprising:
    a burst formation system that forms a frequency domain burst, said burst comprising data symbols and training symbols, said training symbols also encoding configuration information; and
    a transform block that converts said frequency domain burst into a time domain burst for transmission from said first node to said second node; and
    wherein said configuration information comprises at least one of constellation size, convolutional code rate, interleaver depth, and number of parity bytes in Reed-Solomon codewords.

27. In a digital communication system employing orthogonal frequency division multiplexing, a method for receiving configuration information, said method comprising:
    receiving a series of OFDM frequency domain bursts;
    extracting training symbols from said series of OFDM frequency domain bursts;
    estimating channel response based on said training symbols; and
    determining system configuration based on said training symbols; and
    wherein said configuration information comprises at least one of constellation size, convolutional code rate, interleaver depth, and number of parity bytes in Reed-Solomon codewords.

28. In a digital communication system employing orthogonal frequency division multiplexing, apparatus for receiving configuration information, said apparatus comprising:
    a converter that converts a received time domain signal into a series of OFDM frequency domain bursts;
    a selector that extracts training symbols from said series of OFDM frequency domain bursts;
    a channel estimation block that estimates channel response based on said training symbols; and
    a control processor that determines system configuration based on said training symbols; and
    wherein said configuration information comprises at least one of constellation size, convolutional code rate, interleaver depth, and number of parity bytes in Reed-Solomon codewords.

29. In a digital communication system employing orthogonal frequency division multiplexing, apparatus for transmitting configuration information from a first node to a second node, said apparatus comprising:
    means for forming a frequency domain burst, said burst comprising data symbols and training symbols, said training symbols also encoding configuration information; and
    means for transmitting said frequency domain burst from said first node to said second node; and
    wherein said configuration information comprises at least one of constellation size, convolutional code rate, interleaver depth, and number of parity bytes in Reed-Solomon codewords.

30. In a digital communication system employing orthogonal frequency division multiplexing, apparatus for receiving configuration information, said apparatus comprising:
    means for receiving a series of OFDM frequency domain bursts;
    means for extracting training symbols from said series of OFDM frequency domain bursts;

means for estimating channel response based on said training symbols; and means for determining system configuration based on said training symbols; and wherein said configuration information comprises at least one of constellation size, convolutional code rate, interleaver depth, and number of parity bytes in Reed-Solomon codewords.

31. In a digital communication system employing orthogonal frequency division multiplexing, apparatus for transmitting configuration information from a first node to a second node, said apparatus comprising:

means for developing a first set of training symbols;

means for developing a second set of training symbols, wherein communication configuration information is encoded as phase differences between training symbols of said first set and corresponding symbols of said second set; and means for transmitting a series of OFDM frequency domain bursts including OFDM frequency domain bursts comprising said first set of training symbols and OFDM frequency domain bursts comprising said second set of training symbols.

* * * * *